(12) United States Patent
Risko et al.

(10) Patent No.: US 11,926,174 B2
(45) Date of Patent: Mar. 12, 2024

(54) VITREOUS DEVICE TO CHANGE APPARENT DENSITY WITHIN A METAL CASTING

(71) Applicant: GM Global Technology Operations LLC, Detroit, MI (US)

(72) Inventors: Frank D. Risko, Clarkston, MI (US); Lora Dawn Herron, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/560,466

(22) Filed: Dec. 23, 2021

(65) Prior Publication Data

US 2023/0201916 A1 Jun. 29, 2023

(51) Int. Cl.
*B60B 3/06* (2006.01)
*B22D 19/00* (2006.01)
*B60B 1/08* (2006.01)

(52) U.S. Cl.
CPC ............... *B60B 3/06* (2013.01); *B22D 19/00* (2013.01); *B60B 1/08* (2013.01); *B60B 2310/202* (2013.01); *B60B 2360/32* (2013.01)

(58) Field of Classification Search
CPC .. B60B 1/08; B60B 1/12; B60B 3/007; B60B 3/06; B60B 3/10
See application file for complete search history.

(56) References Cited

U.S. PATENT DOCUMENTS

| | | | | |
|---|---|---|---|---|
| 3,253,862 A * | 5/1966 | Watanabe | ................. | B22C 9/28 164/112 |
| 6,106,075 A * | 8/2000 | Suenaga | ................. | B60B 21/12 152/381.6 |
| 6,325,462 B1 * | 12/2001 | Hummel | ................... | B60B 1/12 301/66 |
| 6,530,624 B2 * | 3/2003 | Stach | ........................ | B60B 3/06 301/66 |
| 6,758,533 B1 * | 7/2004 | Hummel | ................... | B60B 1/08 264/318 |
| 6,877,820 B2 * | 4/2005 | Langgartner | ............. | B60B 3/06 301/64.102 |
| 7,137,675 B1 * | 11/2006 | Simula | ................... | B62D 55/14 305/137 |
| 2008/0143170 A1 * | 6/2008 | Baumgartner | ........ | B60B 21/025 301/30 |
| 2015/0266338 A1 * | 9/2015 | Kim | ....................... | B22D 19/00 164/76.1 |
| 2020/0406674 A1 * | 12/2020 | Denmead | ................ | C08L 63/00 |

* cited by examiner

*Primary Examiner* — Jason R Bellinger
(74) *Attorney, Agent, or Firm* — Vivacqua Crane PLLC

(57) ABSTRACT

A casting system includes a casting for an automobile vehicle having an interior section. Multiple central portions are individually positioned in one of multiple areas of the interior section completely encapsulated by a metal of the casting. An insert member is positioned in individual ones of the multiple central portions, the insert member having a higher melting point than a melting point of a metal of the casting the insert member displaces.

16 Claims, 2 Drawing Sheets

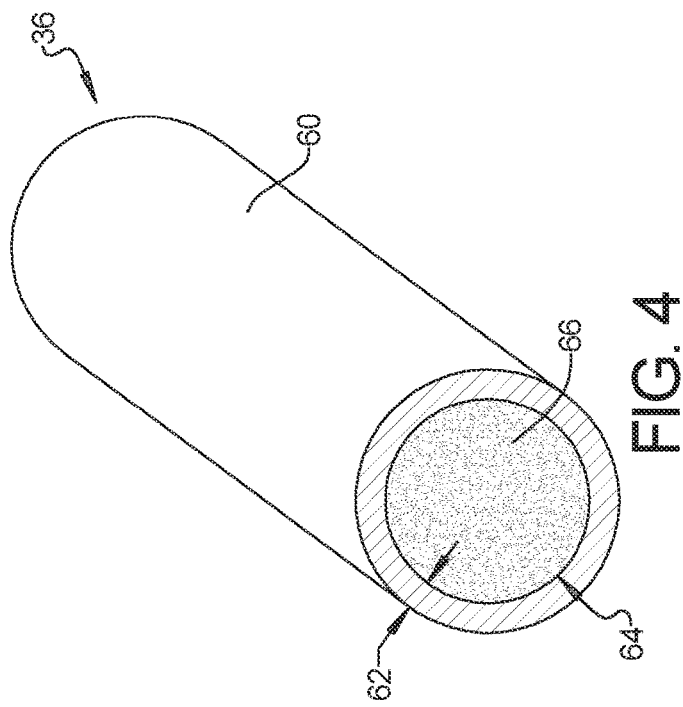
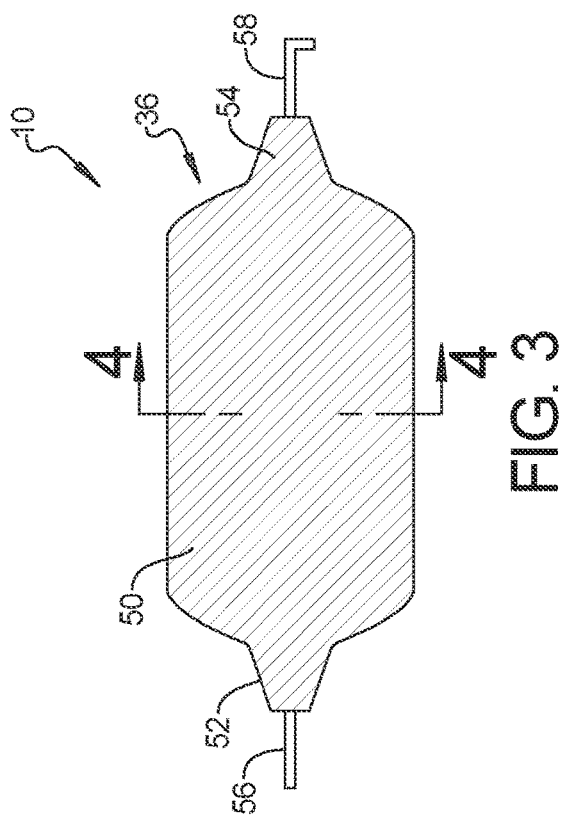
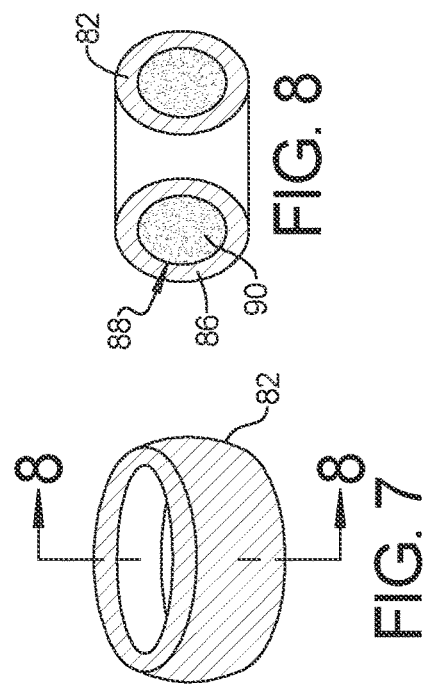
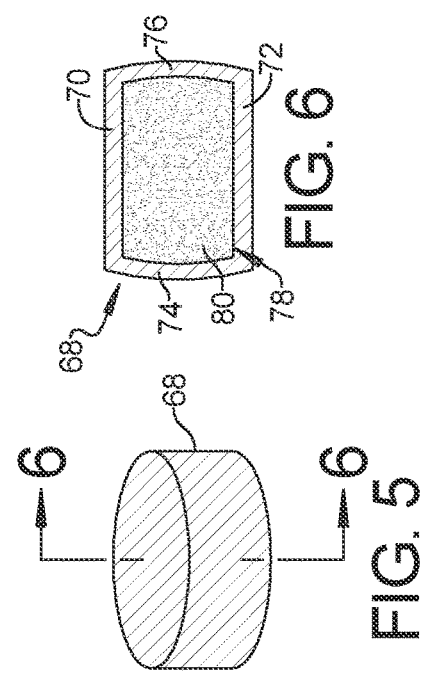

VITREOUS DEVICE TO CHANGE APPARENT DENSITY WITHIN A METAL CASTING

INTRODUCTION

The present disclosure relates to metal casting, particularly to casting of aluminum components.

In automobile vehicle component casting a casting mold is normally produced having a filler sand material to create a cast part geometry. It is often difficult after the casting operation is complete to remove all of the sand from the as-cast component, particularly for complex geometric components such as automobile vehicle cast wheels such as aluminum cast wheels. Casting sand removal paths are therefore incorporated where possible to make removal of casting sand more reproducible. Sand casting is not a viable option however for locations within a complex geometry as-cast component where no path is available to remove the sand after casting is complete. Alternate casting processes are therefore desirable.

It is also desirable to reduce or minimize a total volume and weight of the casting material such as aluminum to reduce a cast component weight and cost without reducing a cast component strength. Placing voids within a cast component has been found to provide weight and cost savings, however voids left within a cast component may create areas of stress in the finished component under loading.

Thus, while current automobile vehicle casting systems achieve their intended purpose, there is a need for a new and improved metal casting system.

SUMMARY

According to several aspects, a casting system includes a casting for an automobile vehicle having an interior section. Multiple central portions are individually positioned in one of multiple areas of the interior section completely encapsulated by a metal of the casting. An insert member is positioned in individual ones of the multiple central portions. The insert member has a higher melting point than a melting point of the metal of the casting the insert member displaces.

In another aspect of the present disclosure, the insert member defines a vitreous material and the casting defines a cast wheel.

In another aspect of the present disclosure the insert member includes a length which maximizes a volume of the multiple central portions; and the insert member is spaced inwardly from a raised rim of the cast wheel at a spacing distance and are positioned at a depth from an outer surface of the cast wheel.

In another aspect of the present disclosure, the insert member includes a first tapered end and an oppositely positioned second tapered end to help locate and retain the insert member within a casting mold cavity prior to a pour of the metal of the cast wheel.

In another aspect of the present disclosure, the insert member includes a first wire rod extending outwardly from the first tapered end and a second wire rod extending outwardly from the second tapered end.

In another aspect of the present disclosure, the first wire rod and the second wire rod are retained in place in a final as-cast condition of the cast wheel.

In another aspect of the present disclosure, the insert member includes an internal bore filled with at least one filler material.

In another aspect of the present disclosure, the at least one filler material has a density different from the metal of the casting the insert member displaces and a higher melting point than the metal of the casting the insert member displaces to create a localized lower apparent density within the casting.

In another aspect of the present disclosure, the insert member has a density less than or equal to a density of a same volume of the metal of the casting the insert member displaces.

In another aspect of the present disclosure, the casting includes a cylindrical-shaped hub fixed to a spider section, and wherein the casting defines a cast wheel having multiple spokes defining the interior section, individual ones of the multiple spokes having one of the multiple central portions.

According to several aspects, a casting includes a cast wheel provided for an automobile vehicle including multiple spokes, individual ones of the multiple spokes being substantially identical to the other ones of the multiple spokes and are equidistantly spaced from a successive one of the multiple spokes to maintain an even weight distribution. Individual ones of the multiple spokes extend inwardly from a raised bead of a spider section to a centrally positioned axle receiving portion. A central portion of individual ones of the multiple spokes is completely encapsulated by a metal of the multiple spokes. A vitreous material insert member is positioned in individual ones of the central portions, the insert member having a higher melting point than a melting point of a metal of the cast wheel the insert member displaces.

In another aspect of the present disclosure, individual ones of the insert members include an internal bore filled with at least one filler material.

In another aspect of the present disclosure, the filler material has a density different from the metal of the cast wheel to create a localized lower apparent density within the cast wheel.

In another aspect of the present disclosure, the filler material includes one of a polymer, an agricultural waste material and an offal material.

In another aspect of the present disclosure, the insert member remains permanently in place for a life of the cast wheel and the insert member is retained in a specific location.

In another aspect of the present disclosure, the insert member includes at least one wire extending outwardly from an end of the insert member to act as a retention member retaining the insert member in the specific location.

In another aspect of the present disclosure, the insert member is sealed to ensure that a filler material within a cavity of the insert member cannot contaminate the metal of the cast wheel. Air present within the insert member is evacuated prior to sealing to a lower internal pressure to allow for outgassing of the filler material due to a heat of casting.

According to several aspects, a method for creating a localized lower apparent density within a cast wheel, comprises: casting a cast wheel for an automobile vehicle including multiple spokes, individual ones of the multiple spokes being substantially identical to the other ones of the spokes; extending individual ones of the multiple spokes inwardly from a raised bead of a spider section to a centrally positioned axle receiving portion; completely encapsulating a central portion of individual ones of the spokes by a metal of the spokes; and positioning an insert member in individual ones of the central portions, the insert member defining a vitreous material having a higher melting point than a melting point of a metal of the cast wheel the insert member displaces, and the insert member remaining permanently in place for a life of the cast wheel and is retained in a specific location.

In another aspect of the present disclosure, the method further includes extending at least one wire outwardly from an end of the insert member to act as a retention member retaining the insert member in the specific location after casting the cast wheel.

In another aspect of the present disclosure, the method further includes: positioning a filler material within a cavity of the insert member; sealing the insert member to ensure that the filler material within the cavity cannot contaminate the metal of the cast wheel; and evacuating air present within the insert member prior to sealing the insert member to a lower internal pressure to allow for outgassing of the filler material due to a heat of casting.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a front elevational view of a vitreous device of the present disclosure;

FIG. 4 is a cross sectional end perspective view of the vitreous device of FIG. 3;

FIG. 5 is a front perspective view of a further vitreous device of the present disclosure;

FIG. 6 is a cross sectional front elevation view taken at section 6 of FIG. 5;

FIG. 7 is a front perspective view of a further vitreous device of the present disclosure; and FIG. 8 is a cross sectional front elevation view taken at section 8 of FIG. 7.

DETAILED DESCRIPTION

The following description is merely exemplary in nature and is not intended to limit the present disclosure, application, or uses.

Figure 1:
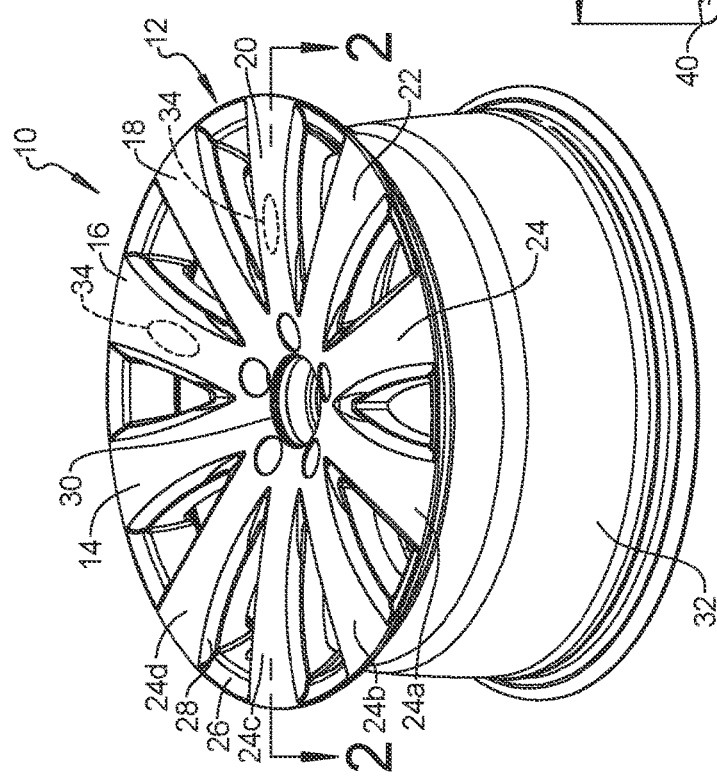
FIG. 1 is a front elevational perspective view of a wheel casting having multiple vitreous devices embedded within the casting according to an exemplary aspect.

Referring to FIG. 1, a casting system 10 according to an exemplary aspect provides a casting which for example may be a cast wheel 12 provided for an automobile vehicle. The cast wheel 12 includes having an interior section defining multiple spokes, including in certain aspects a first spoke 14, a second spoke 16, a third spoke 18, a fourth spoke 20, a fifth spoke 22 and a sixth spoke 24. A quantity of the spokes may also be more or less than the six spokes depicted at the discretion of the wheel designer and may include a ten (10) spoke design shown also including spokes 24a, 24b, 24c and 24d. Each of the spokes are substantially identical to the other ones of the spokes and are equidistantly spaced from a successive one of the spokes to maintain an even weight distribution which provides for a spin balance of the cast wheel 12. Individual ones of the spokes extend inwardly from a raised bead 26 of a spider section 28 to a centrally positioned axle receiving portion 30. The spider section 28 is fixed to a cylindrical-shaped hub 32.

It is known that wheel dynamic loading during automobile vehicle operation is high within the cylindrical-shaped rim 32 and lowest in central portions 34 of the individual spokes defining areas of the interior section completely encapsulated by a metal of the casting. It may be beneficial to eliminate metal in the central portions 34 to minimize a wheel total weight and a wheel cost, for example by leaving voids in the cast spokes defining the central portions 34. The central portions 34 are completely encapsulated by the metal of the spokes. Because wheel casting of a metal such as aluminum or magnesium is normally conducted using a sand-casting process, sand would be used to create the voids. Access to remove the sand from the cast component after the casting process is complete must therefore be provided to allow for the voids in the cast component. Encapsulated areas within the spokes such as the central portions 34 do not readily allow for sand removal from the central portions 34 after the casting operation.

It is therefore desirable to place a permanently retained, fixed volume element at the central portions 34 as a substitute for the sand. The fixed volume element, shown and described in greater detail in reference to FIGS. 2 through 8, should have melting point higher than the metal it is replacing and have a density less than or equal to a density of the same volume of wheel metal such as aluminum or magnesium.

Referring to FIG. 2 and again to FIG. 1, to reduce a total weight and cost of the cast wheel 12 the fixed volume element defines an insert member 36 positioned in individual ones of the central portions 34. The insert member 36 has a higher melting point than a melting point of the metal of the casting the insert member displaces. The insert member 36 has a length 38 which maximizes a volume of the central portions 34. Individual ones of the insert members 36 are spaced inwardly from a raised flange 40 of the cast wheel 12 at a spacing distance 42 and are positioned at a depth 44 below an outer surface 46 of the cast wheel 12. The insert member 36 is generally thicker than a wall thickness 48 of the cylindrical-shaped rim 32, therefore insert members 36 are not placed within the walls of the cylindrical-shaped rim 32.

Referring to FIG. 3 according to several aspects the insert member 36 has a body produced for example from a vitreous material which has a higher melting point than the metal it is displacing such as aluminum or magnesium. The vitreous material may be made of post-consumer glasses of mixed colors, which are not currently recycled or reused. The vitreous material may also be a ceramic material or produced from virgin material. A shape of the insert member 36 may be described as an ampoule as shown in FIG. 3 with a vitreous cylindrical-shaped body portion 50, a tubular body portion as shown in reference to FIG. 4, a capsule as shown in reference to FIG. 5, and a torus as shown in reference to FIG. 7.

With continuing reference to FIG. 3 to help locate and retain the insert member 36 within the casting mold cavity prior to metal pour, the insert member 36 may include a first tapered end 52 and an oppositely positioned second tapered end 54. Further retention capability may also be provided by the extension of a first wire rod 56 outwardly from the first tapered end 52 and extension of a second wire rod 58 outwardly from the second tapered end 54. The first tapered end 52, the second tapered end 54, the first wire rod 56 and the second wire rod 58 are retained in place in the final as-cast condition of the cast wheel 12.

Figure 2:
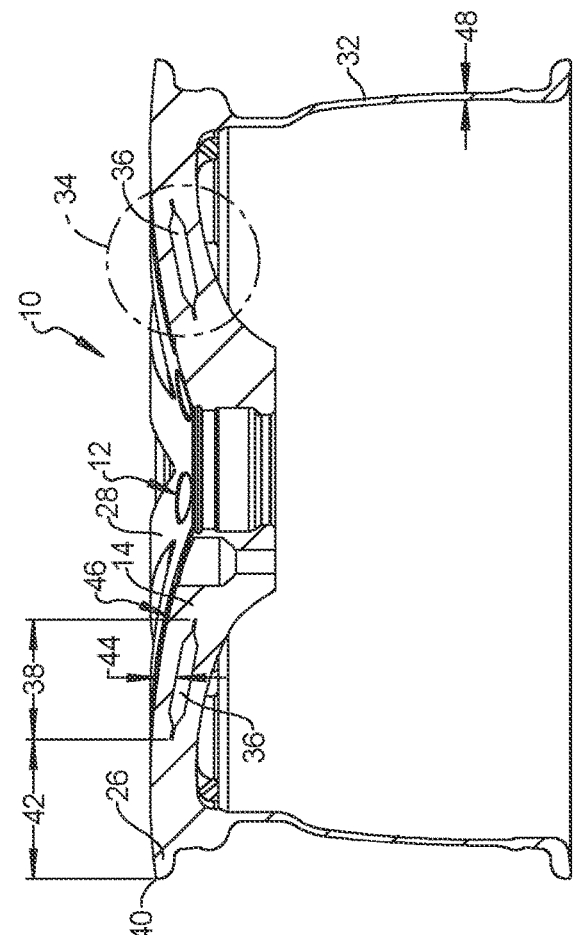
FIG. 2 is a cross sectional elevational view taken at section 2 of FIG. 1.

Referring to FIG. 4 and again to FIGS. 1 through 3, the insert member 36 may also define a vitreous hollow sleeve 60 having a wall thickness 62 defining an internal bore 64 which may retain an internal pressure less than or greater than an ambient pressure. The internal bore 64 may also be filled with at least one filler material 66 having a density different from the casting metal and a higher melting point than the metal it is replacing to create a localized lower apparent density within the cast wheel 12. The internal bore 64 of the insert member 36 is sealed within to prevent crushing of the insert member 36 during the mold assembly and subsequent metal pour. The filler material 66 may have a lower density or a higher density than the casting material. According to several aspects the filler material 66 may be, but is not limited to the following:
- polymeric material—e.g., ground forms of ocean plastics, painted plastic scrap, plastic offal from PET or PA spinning, or polyphthalamide (PPA) reclaim
- agricultural waste material—e.g., coir, corn stalk fiber, animal hair, dried coffee grounds, walnut shell grounds, cocoa shell grounds, or rice husk waste
- industrial offal material—e.g., spent molding sand, ground metal oxide/slag/dross, or auto recycler shedder fluff.

Referring to FIG. 5, the insert member 36 may also define a vitreous body capsule 68.

Referring to FIG. 6 and again to FIG. 5, the vitreous body capsule 68 may include a first outer wall 70 and an oppositely directed second outer wall 72. A first end wall 74 is positioned oppositely about a second end wall 76 and both end walls are oriented transverse to the outer walls. An enclosed cavity 78, similar to the internal bore 64 described in reference to FIG. 4, may be filled with at least one filler material 80 having a density different from the casting metal and a higher melting point than the metal it is replacing to create a localized lower apparent density within cast wheel 12.

Referring to FIG. 7, the insert member 36 may also define a vitreous body torus 82. The vitreous body torus 82 includes a hollow central bore which contains no filler material.

Referring to FIG. 8 and again to FIG. 7, the vitreous body torus 82 includes a circular-shaped body 86 having an enclosed cavity 88. The enclosed cavity 88 may contain a filler material 90 having a density different from the casting material and a higher melting point than the metal it is replacing to create a localized lower apparent density within the cast wheel 12.

Materials which may be used for the system and method of the present disclosure are presented in Table 1 below, which are compared to the properties of aluminum which is a common material used in the manufacture of automobile vehicle wheels.

TABLE 1

| Material | Source | Waste Stream | Bio Content | Recycled Content | Density (g/cm$^3$) |
| --- | --- | --- | --- | --- | --- |
| Ocean Plastic mostly high density polyethylene (HPDE), low density polyethylene (LDPE), polypropylene (PP) | polymer | X | | X | ~0.92-0.98 |
| Plastic Offal from polyethylene terephthalate (PET) or PA spinning | polymer | X | | X | ~1.14-1.38 |
| Polyphthalamide (PPA) reclaim | polymer | X | | X | ~1.20 |
| Coir | coconut | X | X | | ~1.40 |
| Corn stalk fiber | corn | X | X | | 0.1275 |
| Hair Fiber - sheep/dog/reindeer | agricultural/animal | X | X | | ~1.314 |
| Basalt fiber | lava rock | X | X | | 3 |
| Coffee grounds | coffee | X | X | | ~0.32 |
| Walnut shell grounds | walnut | X | X | | 0.45-.065 |
| Cocoa shell grounds | cocoa | X | X | | 0.35 |
| Rice husk waste | rice | X | X | | 0.34-0.4 |
| Glass | Post-consumer | X | | | 2.4-2.8 |
| Waste Molding Sand | Post industrial | X | | | 1.444 or 1.682 |
| Aluminum | | | | | 2.67-2.7 |

A casting system 10 and a method for creating a localized lower apparent density within a cast wheel of the present disclosure provides for the use of a vitreous device positioned within an ampoule, capsule, torus or cylinder having an inert, waste material filler which has a higher melting point than the metal it is replacing to create a localized lower apparent density within the casting. The casting is designed such that the insert member 36 remains permanently in place for the life of the casting and to keep the insert member 36 in a specific location. The insert member 36 may be hollow or filled with a material with a different density than the casting material (e.g. aluminum or magnesium). The insert member 36 is designed such that the filler (if used) cannot interact with the molten metal during the casting operation. The filler material may consist of materials which are typically viewed as waste products from agricultural, industrial offal, or post-consumer plastics or packaging. To reduce casting mass, the filler has a density lower than a density of the metal being displaced to create a localized lower apparent density in the finished casting. The localized reduction in density reduces the over casting mass and diverts waste materials from landfills, thereby improving the sustainability of the casting process. The use of denser waste material may also be used to alter a resonance frequency of the casting to attenuate structure-borne noise.

The insert member 36 is sealed to ensure that a filler material if present cannot contaminate the casting material. Air present within the insert member 36 may be evacuated prior to sealing to a lower internal pressure to allow for outgassing of the filler material due to a heat of the casting process. The air may also be displaced with a gas which prevents outgassing of the filler material due to the heat of the casting process.

The casting is designed such that the vitreous device remains in a specific location within the casting, for the entirety of its lifespan. According to several aspects, this is accomplished using a wire or a rod, hereinafter the first and second rods 56, 58 described in reference to FIG. 3, which are a compatible alloy added to the tapered ends 52, 54 of the insert member 36 which thereafter interface with the molding cavity to the insert member 36 in position during the subsequent casting process. According to several aspects a single wire may replace the first and second rods 56, 58 and extend entirely through the insert member 36. The tapered ends 52, 54 of the insert member 36 may also be designed such that the shape of the insert member 36 itself acts in the same manner as the first and second rods 56, 58. The insert member 36 may be used with current core setting technology used in semi-permanent molds or sand castings. The insert member 36 may also be used with low and high pressure die casting technologies.

The system and method of the present disclosure using one or more of the insert members 36 changes an apparent density of a metal casting in a localized area, by displacing a portion of the casting metal corresponding to a volume of the insert member 36 and replacing this metal with a different, less expensive and lower density material.

Mass reduction of parts is in demand, as is sustainability of the part creation process. The system and method of the present disclosure reduces a mass of casting material required by changing a density in low stress areas of the casting by replacing a load of material with lower density material(s), which would have otherwise been discarded, to help with sustainability objectives.

The system and method of the present disclosure offers several advantages. These include a system of vitreous insert members 36 that provide for the reduction of an amount of metal used in a casting, which is both a cost and a mass savings, achieved by utilizing a lower apparent density. Another advantage is the utilization of waste stream materials to achieve the lower apparent density, which helps these components achieve goals for sustainability and reduction of landfill volume.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A casting system for a vehicle, comprising:
a casting of a wheel of the vehicle, the casting having an interior section;
multiple central portions individually positioned in one of multiple areas of the interior section completely encapsulated by a metal of the casting; and
an insert member positioned in individual ones of the multiple central portions, the insert member comprising a vitreous material having a higher melting point than a melting point of the metal of the casting the insert member displaces, and defining an internal bore, wherein a filler is disposed within the internal bore, the filler comprising a material different from the metal of the casting and different from the vitreous material of the insert member, wherein the filler is comprised of agricultural bio waste material.

2. The casting system of claim 1, wherein:
the insert member includes a length which maximizes a volume of the multiple central portions; and
the insert member is spaced inwardly from a raised flange of the cast wheel at a spacing distance and is positioned at a depth from an outer surface of the cast wheel.

3. The casting system of claim 1, wherein the insert member includes a first tapered end and an oppositely positioned second tapered end to help locate and retain the insert member within a casting mold cavity prior to a pour of the metal of the cast wheel.

4. The casting system of claim 3, wherein the insert member includes a first wire rod extending outwardly from the first tapered end and a second wire rod extending outwardly from the second tapered end.

5. The casting system of claim 4, wherein the first wire rod and the second wire rod are retained in place in a final as-cast condition of the cast wheel.

6. The casting system of claim 1, wherein the filler has a density different from the metal of the casting the insert member displaces and a melting point higher than a melting point of the metal of the casting the insert member displaces to create a localized lower apparent density within the casting.

7. The casting system of claim 1, wherein the insert member has a density less than or equal to a density of a same volume of the metal of the casting the insert member displaces.

8. The casting system of claim 1, wherein the casting includes a cylindrical-shaped rim fixed to a spider section, and wherein the casting includes multiple spokes defining the interior section, individual ones of the multiple spokes having one of the multiple central portions.

9. A casting for a vehicle, comprising:
a cast wheel including multiple spokes, individual ones of the multiple spokes being substantially identical to the other ones of the multiple spokes and are equidistantly spaced from a successive one of the multiple spokes to maintain an even weight distribution of the cast wheel, the cast wheel comprising a metal;
the multiple spokes extending inwardly from a raised flange of a spider section to a centrally positioned axle receiving portion;
a central portion of individual ones of the multiple spokes completely encapsulated by a metal of the multiple spokes; and
an insert member positioned in individual ones of the central portions, the insert member having a vitreous body torus having a circular shaped body with a central bore and an enclosed cavity, the vitreous body torus having a higher melting point than a melting point of a metal of the cast wheel the insert member displaces, the vitreous material comprised of post-consumer glasses of mixed colors, wherein a filler is disposed within the enclosed cavity and not disposed within the central bore, the filler comprising agricultural bio content.

10. The casting of claim 9, wherein the filler material has a density different from a density of the metal of the cast wheel to create a localized lower apparent density within the cast wheel.

11. The casting of claim 9, wherein the insert member remains permanently in place for a life of the cast wheel and the insert member is retained in a specific location.

12. The casting of claim 11, wherein the insert member includes at least one wire extending outwardly from an end of the insert member to act as a retention member retaining the insert member in the specific location.

13. The casting of claim 9, wherein:

the insert member is sealed to ensure that a filler material within a cavity of the insert member cannot contaminate the metal of the cast wheel; and air present within the insert member is evacuated prior to sealing to a lower internal pressure to allow for outgassing of the filler material due to a heat of casting.

14. A method for creating a localized lower apparent density within a cast wheel, comprising:
casting a wheel for an automobile vehicle including multiple spokes, individual ones of the multiple spokes being substantially identical to the other ones of the multiple spokes and are equidistantly spaced from a successive one of the multiple spokes to maintain an even weight distribution of the cast wheel, the cast wheel comprising a metal;
extending individual ones of the multiple spokes inwardly from a raised bead of a spider section to a centrally positioned axle receiving portion;

completely encapsulating a central portion of the individual ones of the multiple spokes by a metal of the multiple spokes; and positioning an insert member in individual ones of the central portions, the insert member defining a vitreous material having a higher melting point than a melting point of the metal of the wheel the insert member displaces, having the insert member remaining permanently in place for a life of the wheel and is retained in a specific location, the insert member defining an internal bore, wherein a filler is disposed within the internal bore, the filler comprising agricultural bio content.

15. The method of claim 14, further including extending at least one wire outwardly from an end of the insert member to act as a retention member retaining the insert member in the specific location after casting the cast wheel.

16. The method of claim 14, further including:

positioning the filler material within the internal bore of the insert member;

sealing the insert member to ensure that the filler material within the internal bore cannot contaminate the metal of the wheel; and evacuating air present within the insert member prior to sealing the insert member to a predetermined internal pressure to allow for outgassing of the filler material due to a heat of casting.

* * * * *